(12) United States Patent
Spindelbalker

(10) Patent No.: US 9,519,157 B2
(45) Date of Patent: Dec. 13, 2016

(54) HINGE JOINT FOR EYEGLASSES

(71) Applicant: Silhouette International Schmied AG, Linz (AT)

(72) Inventor: Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 0 days.

(21) Appl. No.: 14/768,337

(22) PCT Filed: Feb. 21, 2014

(86) PCT No.: PCT/AT2014/050041
§ 371 (c)(1),
(2) Date: Aug. 17, 2015

(87) PCT Pub. No.: WO2014/127394
PCT Pub. Date: Aug. 28, 2014

(65) Prior Publication Data
US 2016/0004093 A1 Jan. 7, 2016

(30) Foreign Application Priority Data
Feb. 22, 2013 (AT) ............... A 50119/2013

(51) Int. Cl.
*G02C 5/22* (2006.01)

(52) U.S. Cl.
CPC ........... *G02C 5/2263* (2013.01); *G02C 5/2209* (2013.01); *G02C 2200/18* (2013.01); *Y10T 16/526* (2015.01)

(58) Field of Classification Search
CPC ....... G02C 5/22; G02C 5/2209; G02C 5/2218; G02C 5/2227; G02C 5/2236; G02C 5/2245; G02C 5/2254; G02C 5/2263; G02C 5/2272; G02C 5/2281; G02C 5/229
See application file for complete search history.

(56) References Cited

U.S. PATENT DOCUMENTS 5,555,037 A * 9/1996 Canavan .................. G02C 5/20
351/111
5,565,937 A * 10/1996 Lee ....................... G02C 5/2263
351/120

(Continued)

FOREIGN PATENT DOCUMENTS

EP     1 131 667 B1    10/2003
EP     2 669 731 A1    12/2013

(Continued)

OTHER PUBLICATIONS

International Search Report of PCT/AT2014/050041, mailed May 30, 2014.

*Primary Examiner* — Jeffrey O Brien
(74) *Attorney, Agent, or Firm* — Collard & Roe, P.C.

(57) ABSTRACT

The invention relates to a hinge joint (4) for eyeglasses, comprising a hinge tab (5) which engages between two limbs of a joint fork (6), and a hinge axis (7) arranged on a pivot arm (10) between the hinge tab (5) and the joint fork (6), wherein the pivot arm (10) can be pivoted about an inclination axis (9) perpendicular to the hinge axis (7) and can be retained in the respective pivot position by means of a latching toothing (12), the latching toothing interacting with a counter-toothing (13) of the pivot arm (10). In order to provide advantageous constructional conditions, it is proposed that the pivot arm (10) is provided in an elongated hole (11) which passes through the hinge tab (5) in the direction of the hinge axis (7), the longitudinal walls of the elongated hole forming the latching toothing (12) which is oriented radially relative to the inclination axis (9) and which interacts with the counter-toothing (13) of the pivot arm (10), and the hinge tab (5) engages between the limbs of the joint fork (5) with pivot play (14) relative to the inclination axis (9).

2 Claims, 1 Drawing Sheet

(56) References Cited

U.S. PATENT DOCUMENTS

| | | | | |
|---|---|---|---|---|
| 6,464,353 | B1* | 10/2002 | Spindelbalker | G02C 5/2263 351/111 |
| 6,631,194 | B2* | 10/2003 | Fukuoka | G02C 5/2245 351/153 |
| 6,837,579 | B1* | 1/2005 | Chen | G02C 5/20 351/119 |
| 6,863,396 | B1* | 3/2005 | Chen | G02C 5/2209 351/110 |
| 6,883,914 | B1* | 4/2005 | Yang | G02C 5/2263 351/120 |
| 7,300,150 | B1* | 11/2007 | Chen | G02C 5/2263 351/120 |
| 2002/0085171 | A1* | 7/2002 | Wang-Lee | G02C 5/20 351/120 |
| 2006/0221299 | A1* | 10/2006 | Wang-Lee | G02C 5/20 351/120 |
| 2013/0308087 | A1* | 11/2013 | Sumitomo | G02C 5/146 351/116 |

FOREIGN PATENT DOCUMENTS

| | | |
|---|---|---|
| WO | 00/22476 A1 | 4/2000 |
| WO | 2012/102093 A1 | 8/2012 |

\* cited by examiner

HINGE JOINT FOR EYEGLASSES

CROSS REFERENCE TO RELATED APPLICATIONS

This application is the National Stage of PCT/AT2014/050041 filed on Feb. 21, 2014, which claims priority under 35 U.S.C. §119 of Austrian Application No. A 50119/2013 filed on Feb. 22, 2013, the disclosure of which is incorporated by reference. The international application under PCT article 21(2) was not published in English.

FIELD OF THE INVENTION

The invention relates to a hinge joint for eyeglasses, comprising a hinge tab which engages between two limbs of a joint fork, and a hinge axis arranged on a pivot arm between the hinge tab and the joint fork, wherein the pivot arm can be pivoted about an inclination axis perpendicular to the hinge axis and can be retained in each pivoting position by means of a latching toothing, said latching toothing interacting with a counter-toothing of the pivot arm.

DESCRIPTION OF THE PRIOR ART

For adjusting the inclination of a bow of the eyeglasses in relation to the spectacle frame forming the frame for the eyeglasses, it is known (EP 1 131 667 B1) to form the middle hinge tab with the integrally attached hinge axis as a pivot arm, which is pivotably mounted in a receiving pocket of the spectacle frame about an inclination axis perpendicular to the hinge axis and is retained in the individual inclination positions by a latching toothing. Said latching toothing is provided on the side walls of the receiving pocket and interacts with a counter-toothing on the tab-like pivot arm. The pivoting of the hinge tab and thus the hinge axis about the inclination axis allows providing the inclination of the bow of the eyeglasses in angular steps which are predetermined by the latching toothing. The additional pivot bearing of the middle hinge tab of the hinge joint produces a comparatively complex construction, which further requires respective space, thus limiting the design possibilities for the eyeglasses.

SUMMARY OF THE INVENTION

The invention is thus based on the object of providing a hinge joint with the possibility of adjusting the inclination angle of the bow of the eyeglasses in such a way that in comparison with hinge joints for eyeglasses without an inclination axis there are substantially the same spatial requirements and the additional constructional effort remains at a low level.

Based on a hinge joint of the kind mentioned above, this object is achieved by the invention in such a way that the pivot arm is provided in an elongated hole which passes through the hinge tab in the direction of the hinge axis, the longitudinal walls of said elongated hole forming the latching toothing which is oriented radially relative to the inclination axis and which interacts with the counter-toothing of the pivot arm, and the hinge tab engages between the limbs of the joint fork with pivot play relative to the inclination axis.

Since as a result of this measure it is not the middle hinge tab with the hinge axis that is pivoted but merely the hinge axis in relation to the middle hinge tab, the design effort required for setting the inclination of the bow of the eyeglasses remains low because it is merely necessary to provide the middle hinge tab with an elongated hole for accommodating the pivot arm for the hinge axis, which elongated hole penetrates the hinge tab in the direction of the hinge axis. The pivot arm which is guided in the elongated hole of the hinge tab can only exit the elongated hole in the direction of the hinge axis. Since the joint fork of the hinge joint engages beyond the middle hinge tab on both sides, the pivot arm which carries the hinge axis is also unable to exit from the elongated hole of the hinge tab in the direction of the hinge axis in the position of use of the hinge joint. If therefore a latching toothing which is aligned radially against the geometric inclination axis is provided for the pivot arm forming a counter-toothing, no corporeal inclination axis is required in order to pivot the pivot arm and thus the hinge axis in relation to the hinge tab about the geometric inclination axis. It is merely necessary to ensure respective pivot play between the hinge tab and the limbs of the joint fork. This means that a hinge joint in accordance with the invention is not only of simple configuration, but also allows an overall size which can certainly be compared with hinge joints for eyeglasses without an inclination axis.

Especially simple constructional conditions are obtained if the inclination axis extends in the region of the hinge axis, because in this case the displacement of the hinge axis in relation to the hinge tab is limited to a pivoting adjustment about the inclination axis.

BRIEF DESCRIPTION OF THE DRAWING

The subject matter of the invention is shown in the drawings in closer detail, wherein.

DESCRIPTION OF THE PREFERRED EMBODIMENT

Figure 1:
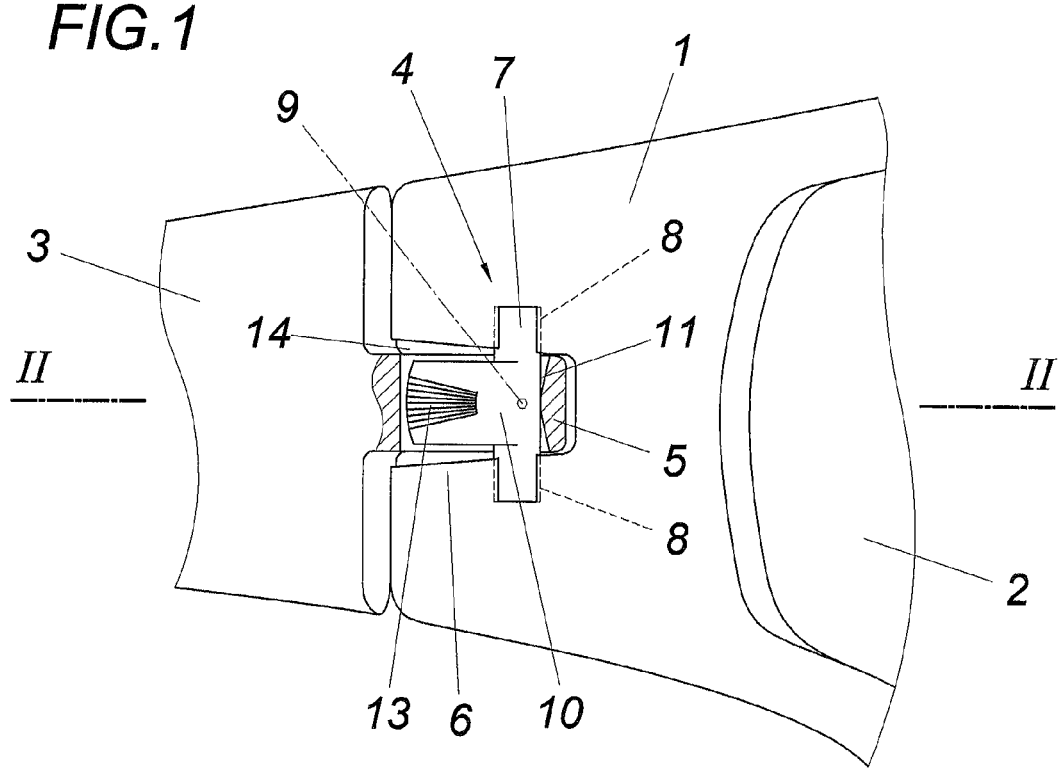
FIG. 1 shows a hinge joint in accordance with the invention between a spectacle frame and a bow of eyeglasses in a partly exposed side view towards the inside of the bow.
Figure 2:
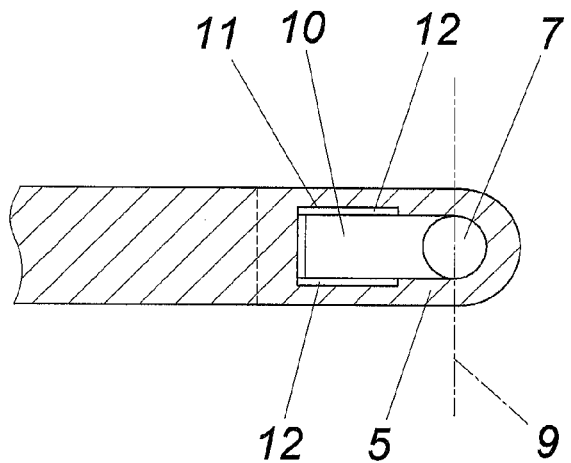
FIG. 2 shows a sectional view through the middle hinge tab of the hinge joint along the line II-II of FIG. 1 on an enlarged scale.

The spectacles shown in FIG. 1 in a sectional view comprises a spectacle frame 1 for accommodating eyeglasses 2 and two bows 3, which are connected via a hinge joint 4 to the spectacle frame 1. Said hinge joint 4 comprises a middle hinge tab 5 and a joint fork 6 which engages around said hinge tab 5 on both sides and which is connected in an articulated manner to the hinge tab 5 via a hinge axis 7. The hinge axis 7 is retained according to the illustrated embodiment in the circumferentially open bearing recesses 8 of the joint fork 6, wherein the stubs of the hinge axis 7 which protrude on both sides beyond the middle hinge tab 5 are pressed in the radial direction in the manner of a snap lock into the bearing recesses 8, which is not mandatory however.

In contrast to conventional hinge joints, the hinge axis 7 of the hinge joint 4 is mounted in a pivotably adjustable manner in relation to the hinge tab 5 about an inclination axis 9 extending perpendicularly to the hinge axis 7. For this purpose, the hinge axis 7 is carried by a pivot arm 10 which is inserted into an elongated hole 11 of the hinge tab 5. Said elongated hole 11 penetrates the hinge tab 5 in the direction of the hinge axis 7, wherein the pivot arm 10 can be pivoted within the elongated hole 11 about the geometric inclination axis 9, which is determined by a latching toothing 12 on the longitudinal walls of the elongated hole 11, said latching toothing 12 being aligned radially in relation to the inclination axis 9. The latching toothing 12 interacts with a respective counter-toothing 13 on the side walls of the pivot arm 10, so that the pivot arm 10 can be pivoted in relation to the hinge tab 5 about angular steps according to the indexing of the latching toothing 12. For the purpose of setting the inclination of the bow 3 in relation to the spectacle frame 1, it is merely necessary to pivot the bow 3 in relation to the frame 1 by overcoming the latching resistance of the latching toothing 12. In order to prevent that said pivoting adjustment is not obstructed by the joint fork 6, a respective pivot play 14 must be provided between the hinge tab 5 and the limbs of the joint fork 6.

The invention claimed is:

1. A hinge joint (4) for eyeglasses, comprising a hinge tab (5) which engages between two limbs of a joint fork (6), and a hinge axis (7) arranged on a pivot arm (10) between the hinge tab (5) and the joint fork (6), wherein the pivot arm (10) is configured to be pivoted about an inclination axis (9) perpendicular to the hinge axis (7) and is retained in a respective pivot position by means of a latching toothing (12), said latching toothing interacting with a counter-toothing (13) of the pivot arm (10), wherein the pivot arm (10) is provided in an elongated hole (11) which passes through the hinge tab (5) in a direction parallel to the hinge axis (7), a pair of longitudinal walls of said elongated hole forming the latching toothing (12) which is oriented radially relative to the inclination axis (9) and which interacts with the counter-toothing (13) of the pivot arm (10), and the hinge tab (5) engages between the limbs of the joint fork (6) with pivot play (14) relative to the inclination axis (9).

2. A hinge joint (4) according to claim 1, wherein the inclination axis (9) extends in the region of the hinge axis (7).

* * * * *